United States Patent
Nguyen Canh et al.

(10) Patent No.: US 12,373,990 B2
(45) Date of Patent: Jul. 29, 2025

(54) METHOD AND APPARATUS FOR UV ATTRIBUTES CODING FOR SYMMETRY MESH

(71) Applicant: Tencent America LLC, Palo Alto, CA (US)

(72) Inventors: Thuong Nguyen Canh, Palo Alto, CA (US); Xiaozhong Xu, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 114 days.

(21) Appl. No.: 18/483,936

(22) Filed: Oct. 10, 2023

(65) Prior Publication Data
US 2024/0135593 A1 Apr. 25, 2024

Related U.S. Application Data

(60) Provisional application No. 63/415,108, filed on Oct. 11, 2022.

(51) Int. Cl.
| | |
|---|---|
| *H04N 19/00* | (2014.01) |
| *G06T 9/00* | (2006.01) |
| *H04N 19/54* | (2014.01) |
| *H04N 19/61* | (2014.01) |

(52) U.S. Cl.
CPC ............ *G06T 9/001* (2013.01); *H04N 19/54* (2014.11); *H04N 19/61* (2014.11)

(58) Field of Classification Search
CPC ........ G06T 9/001; H04N 19/54; H04N 19/61; H04N 19/597; H04N 19/119; H04N 19/527
See application file for complete search history.

(56) References Cited

U.S. PATENT DOCUMENTS

| | | | | |
|---|---|---|---|---|
| 5,790,839 A | * | 8/1998 | Luk .................. | G11C 5/025 713/300 |
| 5,901,304 A | * | 5/1999 | Hwang ............... | G11C 7/22 365/230.06 |
| 6,072,834 A | * | 6/2000 | Kim .................. | H04N 19/176 382/250 |

(Continued)

OTHER PUBLICATIONS

International Search Report dated Jan. 22, 2024 in International Application No. PCT/US23/34881.

(Continued)

*Primary Examiner* — Frank F Huang
(74) *Attorney, Agent, or Firm* — Sughrue Mion, PLLC

(57) ABSTRACT

A method comprising segmenting an input symmetry mesh into multiple non-connected UV segments; partitioning at least one UV segment via a plane that partitions the at least one UV segment into a first side and a second side; reorganizing the plurality of vertices included in the first side of the at least one UV segment; perform a 2D symmetry detection on the at least one UV segment to find a symmetry transform; determining a predicted vertex for each vertex on the second side of the at least one UV segment based on the symmetry transform of a corresponding vertex on the first side of the at least one UV segment to find a predicted vertex on the first side of the at least one UV segment; and encoding a bitstream that comprises at least the vertices within the first side of the at least one UV segment.

20 Claims, 13 Drawing Sheets

(56) References Cited

U.S. PATENT DOCUMENTS

| | | | | |
|---|---|---|---|---|
| 6,097,756 A * | 8/2000 | Han | .................. | H04N 19/537 375/240 |
| 6,580,754 B1 * | 6/2003 | Wan | .................. | H04N 19/33 375/E7.079 |
| 6,728,317 B1 * | 4/2004 | Demos | .................. | H04N 19/17 348/E7.015 |
| 6,765,962 B1 * | 7/2004 | Lee | .................. | H04N 19/124 375/240.03 |
| 6,771,703 B1 * | 8/2004 | Oguz | .................. | H04N 19/59 375/240.03 |
| 6,826,232 B2 * | 11/2004 | Chen | .................. | H04N 19/14 375/240.18 |
| 7,016,412 B1 * | 3/2006 | van Zon | .................. | H04N 19/156 375/240.1 |
| 7,095,782 B1 * | 8/2006 | Cohen | .................. | H04N 21/2404 375/E7.02 |
| 7,245,662 B2 * | 7/2007 | Piche | .................. | H04N 19/46 382/250 |
| 7,263,124 B2 * | 8/2007 | Peng | .................. | H04N 19/34 375/240.03 |
| 7,369,610 B2 * | 5/2008 | Xu | .................. | H04N 21/234327 375/E7.091 |
| 7,391,807 B2 * | 6/2008 | Lin | .................. | H04N 19/124 375/240.03 |
| 7,477,688 B1 * | 1/2009 | Zhang | .................. | H04N 19/40 375/240 |
| 7,627,034 B2 * | 12/2009 | Park | .................. | H04N 19/46 375/240.08 |
| 7,697,608 B2 * | 4/2010 | Lee | .................. | H04N 19/14 375/240.03 |
| 7,729,421 B2 * | 6/2010 | Campisano | .................. | H04N 19/577 375/240.01 |
| 8,040,952 B2 * | 10/2011 | Park | .................. | H04N 21/4347 375/240.01 |
| 8,189,659 B2 * | 5/2012 | Han | .................. | H04N 21/43637 375/240.02 |
| 8,494,042 B2 * | 7/2013 | Park | .................. | H04N 19/513 375/240 |
| 2007/0064791 A1 * | 3/2007 | Okada | .................. | H04N 19/63 375/E7.125 |
| 2009/0028245 A1 * | 1/2009 | Vieron | .................. | H04N 19/109 375/E7.123 |
| 2010/0066760 A1 | 3/2010 | Mitra et al. | | |
| 2011/0243231 A1 * | 10/2011 | Li | .................. | H04N 19/433 375/E7.256 |
| 2011/0268175 A1 * | 11/2011 | Tan | .................. | H04N 19/895 375/E7.026 |
| 2013/0028324 A1 * | 1/2013 | Chang | .................. | H04N 19/433 375/E7.125 |
| 2014/0092970 A1 * | 4/2014 | Misra | .................. | H04N 19/52 375/240.16 |
| 2019/0385352 A1 | 12/2019 | Varekamp | | |
| 2020/0265552 A1 | 8/2020 | Hemmer et al. | | |
| 2025/0056064 A1 * | 2/2025 | Radosavljevic | .................. | H04N 21/234309 |

OTHER PUBLICATIONS

Written Opinion dated Jan. 22, 2024 in International Application No. PCT/US23/34881.

Khaled Mammou et al., "[V-CG] Apple's Dynamic Mesh Coding CfP Response", ISO/IEC JTC 1/SC 29/WG 7, m59281, Online—Apr. 2022, p. 24.

* cited by examiner

UV segment set $\mathcal{U} = \{\emptyset\}, k = 1.$ while $|\mathcal{F}| > 0$
    seed $= \mathcal{F}[0]$
    $\mathcal{U}_k = FindSeg(seed, \mathcal{F})$
    $\mathcal{F} \leftarrow \mathcal{F} - FacesContain(\mathcal{U}_k)$
    $k = k + 1$ Output: segment set $\mathcal{U} = \{\mathcal{U}_1, ..., \mathcal{U}_{k-1}\}$

FIG. 6

```
for f = (v_1, ..., v_K), u = (u_1, u_2, ..., u_K) in F_C, G_C {    // for crossing plane
faces
    Init u_new = {u_1}
    for i from 1 to K - 1 {
        if (v_i ∈ V_R & v_{i+1} ∈ V_R) or (v_i ∈ V_R & v_{i+1} ∈ V_R) {    // if the connection
                                                                             crosses the plane
            v_new = PlaneLineCollision(v_i, v_{i+1}, p)
            u_new = Interpolate(v_i, v_{i+1}, v_new, u_i, u_{i+1})    // Interpolate UV
            u_new = {u_new, u_new, u_{i+1}}                            // add new UV to UV faces
        } else {
            u_new = {u_new, u_{i+1}}
        }
    }
    if num(u_new) > K {
        u_left = {u_i | u_i ∈ u_new and u_i ∉ U_R}      // split faces and add new edges
        u_right = {u_i | u_i ∈ u_new and u_i ∉ U_L}     // Note: remain the same order
        u = u_left ∪ u_right
    }
    G_L = G_L ∪ u
}
Output: mesh with UV set U and faces set G = {G_L, G_R}
```

FIG. 8

Input: left and right UV segment $u^i_L$, $u^i_R$, symmetry plane $Q$

Init left and right UV: $U^i_L = \{\emptyset\}, U^i_R = \{\emptyset\}$
foreach $u_L$ in $u^i_L$
  $v_L$ = FindVertex($u_L$)
  $u_R$ = SymmPred($v_L$, $Q$)
  $v_R$ = FindUVs($v_R$) ∩ $u^i_R$
  if $u_R \neq \emptyset$
    $U^i_L \leftarrow [U^i_L, u_L]$
    $U^i_R \leftarrow [U^i_R, u_R]$ Output: Corresponding pair sets $U^i_L, U^i_R$

FIG. 9

METHOD AND APPARATUS FOR UV ATTRIBUTES CODING FOR SYMMETRY MESH

CROSS-REFERENCE TO RELATED APPLICATION

This application claims priority from U.S. Provisional Application No. 63/415,108 filed on Oct. 11, 2022, the disclosure of which is incorporated herein by reference in its entirety.

FIELD

This disclosure is directed to a set of advanced video coding technologies. More specifically, the present disclosure is directed to UV attributes coding for a symmetry mesh.

BACKGROUND

VMesh is an ongoing MPEG standard to compress dynamic meshes. The current VMesh reference software compresses meshes based on decimated base meshes, displacements vectors and motion fields. The displacements are calculated by searching the closest point on the input mesh with respect to each vertex of the subdivided based mesh. The displacement vectors are transformed into wavelet coefficients by a linear lifting scheme, and then the coefficients are quantized and coded by a video codec or arithmetic codec.

Reflection symmetry is a popular characteristic of mesh coding, especially computer generated meshes. Symmetry was utilized to compress symmetry mesh. Vertices are divided into a left and right part of a symmetry plane. The left part is encoded by mesh coding while the right part is encoded by a symmetry prediction and displacement coding. Even though UV attributes also have a certain level of symmetry, UV attributes may have different symmetry properties such as transition and rotation. However, UV attribute compression for a symmetric mesh have yet to be exploited.

Attributes connected to vertices also have a certain level of symmetry. However, associated UV of symmetric vertices do not always display mirror symmetry. Accordingly, conventional mesh compression methods do not utilize these types of symmetric properties to compress attributes of a mesh.

SUMMARY

According to one or more embodiments, a method of encoding an input symmetry mesh, the method comprising: segmenting the input symmetry mesh into multiple non-connected UV segments in a UV attribute map; partitioning at least one UV segment via a plane that partitions the at least one UV segment into a first side and a second side opposite to the first side, the first side including a plurality of vertices occupying a first area; reorganizing the plurality of vertices included in the first side of the at least one UV segment, wherein the plurality of vertices occupy a second area less than the first area after the reorganizing; perform a 2D symmetry detection on the at least one UV segment to find a symmetry transform for the at least one UV segment; determining a predicted vertex for each vertex on the second side of the at least one UV segment based on the symmetry transform of a corresponding vertex on the first side of the at least one UV segment to find a predicted vertex on the first side of the at least one UV segment; and encoding a bitstream that comprises at least the vertices within the first side of the at least one UV segment.

According to one or more embodiments, an encoder for encoding an input symmetry mesh, the encoder comprising: at least one memory configured to store program code; and at least one processor configured to read the program code and operate as instructed by the program code, the program code including: segmenting code configured to cause the at least one processor to segment the input symmetry mesh into multiple non-connected UV segments in a UV attribute map; partitioning code configured to cause the at least one processor to partition at least one UV segment via a plane that partitions the at least one UV segment into a first side and a second side opposite to the first side, the first side including a plurality of vertices occupying a first area; reorganizing code configured to cause the at least one processor to reorganize the plurality of vertices included in the first side of the at least one UV segment, wherein the plurality of vertices occupy a second area less than the first area after the reorganization; symmetry transform code configured to cause the at least one processor to perform a 2D symmetry detection on the at least on UV segment to find a symmetry transform for the at least one UV segment; determining code configured to cause the at least one processor to determine a predicted vertex for each vertex on the second side of the at least one UV segment based on the symmetry transform and a corresponding vertex on the first side of the at least one UV segment to find a predicted vertex corresponding to the vertex on the first side of the at least one UV segment; and encoding code configured to cause the at least one processor to encode a bitstream that comprises at least the vertices within the first side of the at least one UV segment.

According to one or more embodiments, a non-transitory computer readable medium having instructions stored therein, which when executed by a processor of an encoder for encoding an input symmetry mesh cause the processor to execute a method comprising: segmenting the input symmetry mesh into multiple non-connected UV segments in a UV attribute map; partitioning at least one UV segment via a plane that partitions the at least one UV segment into a first side and a second side opposite to the first side, the first side including a plurality of vertices occupying a first area; reorganizing the plurality of vertices included in the first side of the at least one UV segment, wherein the plurality of vertices occupy a second area less than the first area after the reorganizing; perform a 2D symmetry detection on the at least one UV segment to find a symmetry transform for the at least one UV segment; determining a predicted vertex for each vertex on the second side of the at least one UV segment based on the symmetry transform of a corresponding vertex on the first side of the at least one UV segment to find a predicted vertex on the first side of the at least one UV segment; and encoding a bitstream that comprises at least the vertices within the first side of the at least one UV segment.

BRIEF DESCRIPTION OF THE DRAWINGS

Further features, the nature, and various advantages of the disclosed subject matter will be more apparent from the following detailed description and the accompanying drawings in which:

FIG. 6 is an illustration of an example algorithm of segmenting a UV mesh based on UV connectivity, in accordance with embodiments of the present disclosure.

FIG. 8 is an illustration of an example algorithm for partitioning a mesh, in accordance with embodiments of the present disclosure.

FIG. 9 is an illustration of an example algorithm for determining corresponding pairs of vertices in a mesh, in accordance with embodiments of the present disclosure.

DETAILED DESCRIPTION

Figure 1:
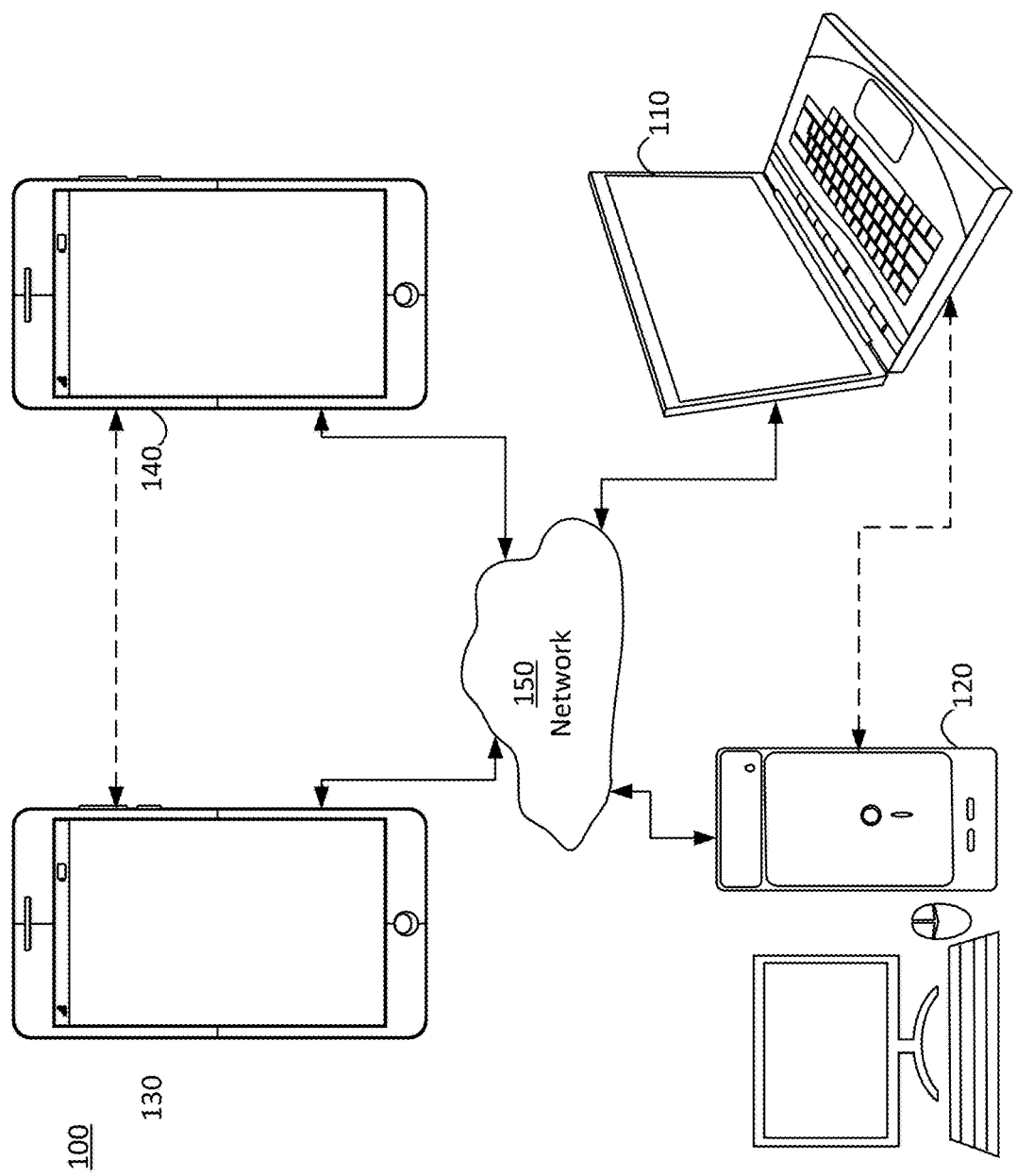
FIG. 1 is a schematic illustration of a block diagram of a communication system, in accordance with embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

The proposed methods may be used separately or combined in any order and may be used for arbitrary polygon meshes. Embodiments of the present disclosure are directed to encoding UV coordinates for symmetry-based mesh coding. Particularly, the embodiments are directed to reducing and reorganizing a mesh. The mesh may be reduced by first cutting the mesh in half, and further reducing the mesh into smaller segments. The mesh may be further reorganized and made more compact by utilizing transforms that enable a mapping between one side of coordinates (e.g., left side) and another side of coordinates (e.g., right side). The embodiments result in a more compact mesh being encoded. As a result, at least one side of the mesh is discarded resulting in a more compact mesh being encoded. Therefore, the embodiments result in improved mesh compression leading to faster encoding and smaller bitstreams for transmission.

Figure 2:
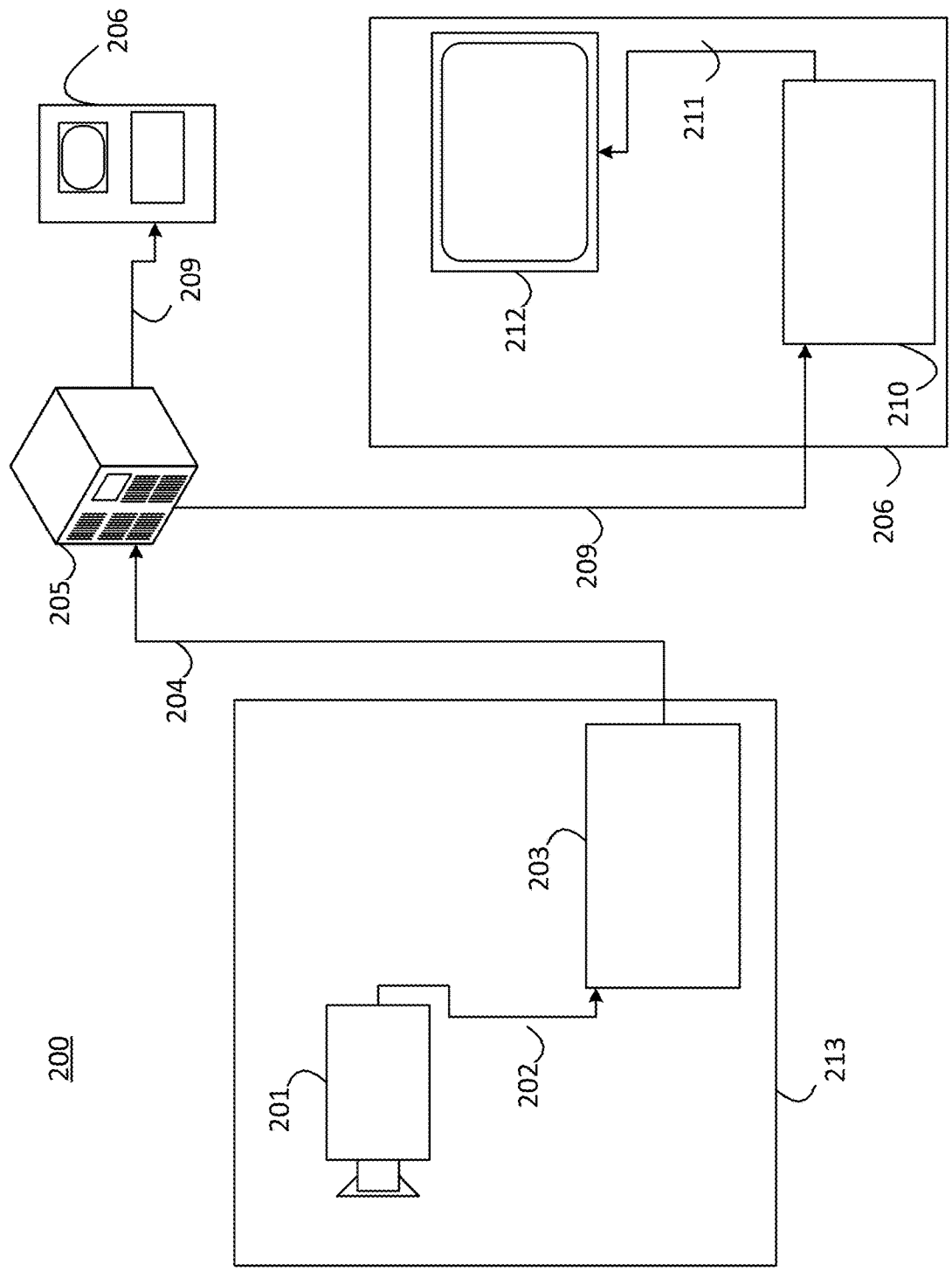
FIG. 2 is a schematic illustration of a block diagram of a streaming system, in accordance with embodiments of the present disclosure.

With reference to FIGS. 1-2, one or more embodiments of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter may be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 may create, for example, a stream 202 that includes a 3D mesh and metadata associated with the 3D mesh. The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, may be processed by the encoder 203 coupled to the video source 201. The encoder 203 may include hardware, software, or a combination thereof to enable or implement aspects of the disclosed subject matter as described in more detail below. The encoder 203 may also generate an encoded video bitstream 204. The encoded video bitstream 204, which may have a lower data volume when compared to the uncompressed stream 202, may be stored on a streaming server 205 for future use. One or more streaming clients 206 may access the streaming server 205 to retrieve video bit streams 209 that may be copies of the encoded video bitstream 204.

The streaming clients 206 may include a video decoder 210 and a display 212. The video decoder 210 may, for example, decode video bitstream 209, which is an incoming copy of the encoded video bitstream 204, and create an outgoing video sample stream 211 that may be rendered on the display 212 or another rendering device. In some streaming systems, the video bitstreams 204, 209 may be encoded according to certain video coding/compression standards.

Figure 3:
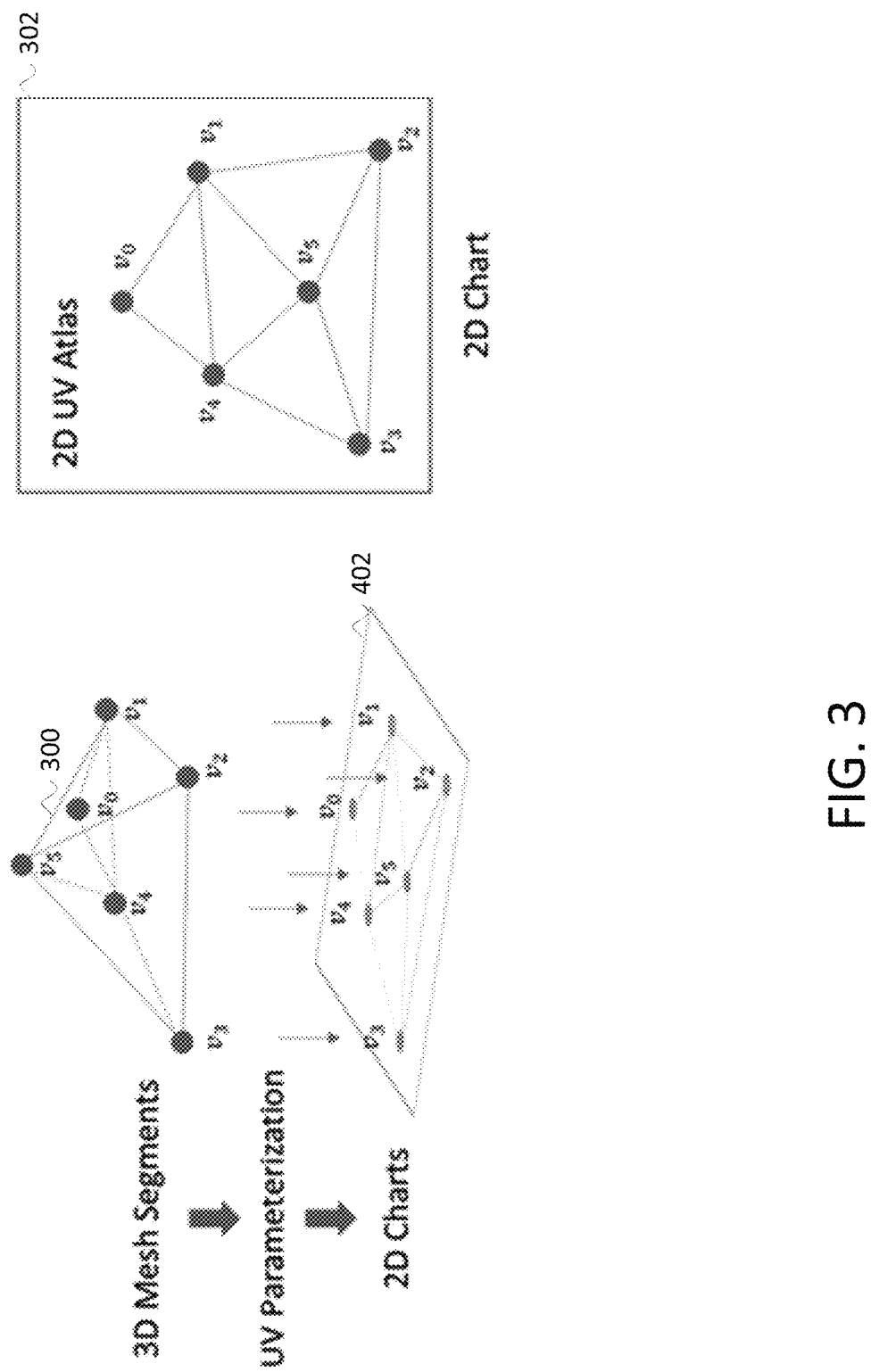
FIG. 3 illustrates an example of UV parameterization mapping from 3D mesh segments onto 2D charts, in accordance with embodiments of the present disclosure.

According to one or more embodiments, a 3D mesh may be partitioned into several segments (or patches/charts). Each segment may be composed of a set of connected vertices associated with their geometry, attribute, and connectivity information. As illustrated in FIG. 3, a UV parameterization process maps a mesh segment 300 onto a 2D chart in the 2D UV atlas (302, 304). Each vertex in the mesh segment may be assigned with a 2D UV coordinates in the 2D UV atlas. The vertices in a 2D chart may form a connected component as their 3D counterpart. The geometry and connectivity information of each vertex may be inherited from their 3D counterpart as well. Therefore, the UV coordinates map vertices in a 2D space to the 3D space based on associated UV attributes that include geometry and connectivity information.

A mesh may be a collection of vertices, edges, and faces that define a shape or an object. A 3D mesh may include a plurality of vertices, with each vertex associated with a 3D coordinate in a 3D space (e.g., x, y, z). A 2D mesh may include a plurality of vertices with each vertex associated a 2D coordinate in a 2D space (e.g., x and y). The vertices may be connected to form edges, where a collection of vertices may define a face.

Figure 4:
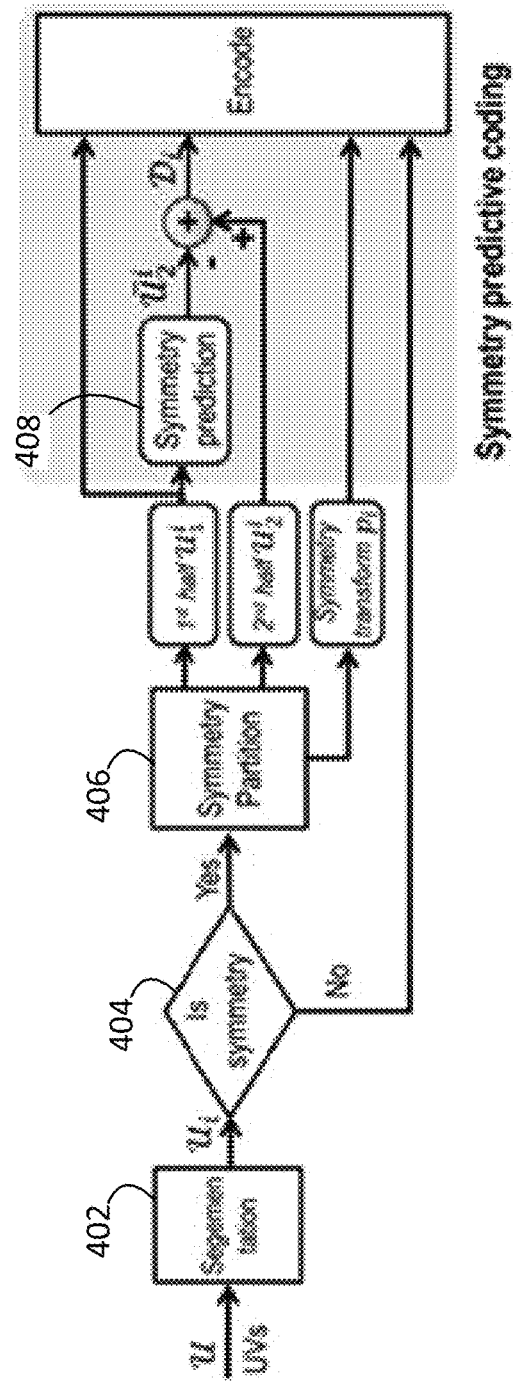
FIG. 4 is a schematic illustration of a system for performing symmetry predictive coding for UV attributes, in accordance with embodiments of the present disclosure.

According to one or more embodiments, FIG. 4 illustrates a framework to compress UV map of a symmetry mesh. A symmetry mesh M may have a mirror symmetry plane p that separate vertices $V$ into a set of left vertices $V_L$, a set of right vertices $V_R$, and a set of in symmetry plane vertices $V_j$; faces F into a set of left faces $F_L$, a set of right faces $F_R$, and a set of cross symmetry plane faces $F_C$. In one or more examples, one vertex may have multiple UV attributes, and thus, the symmetry property of vertices do not apply directly to UV attributes. Therefore, according to one or more embodiments, UV attributes $U$ are segmented 402 to non-connected parts $U_i$, and apply a 2D symmetry prediction. If symmetry property is detected 404 for i-th segment with symmetry transform $p_i$, the segment is partitioned 406, and the first half UV attributes $U_K^i$ ($U_L^i$ left UV and $U_j^i$ in-symmetry plane UV) are coded and used as the prediction 408 for the second half $U_R^i$ via a symmetry prediction method 408. The displacement between the predicted and original of the second half are encoded in a bitstream. The first half UV and non-symmetry UV are coded, and the parameters of a symmetry transform may also be signaled in the encoded bitstream.

Figures 5A, 5B:
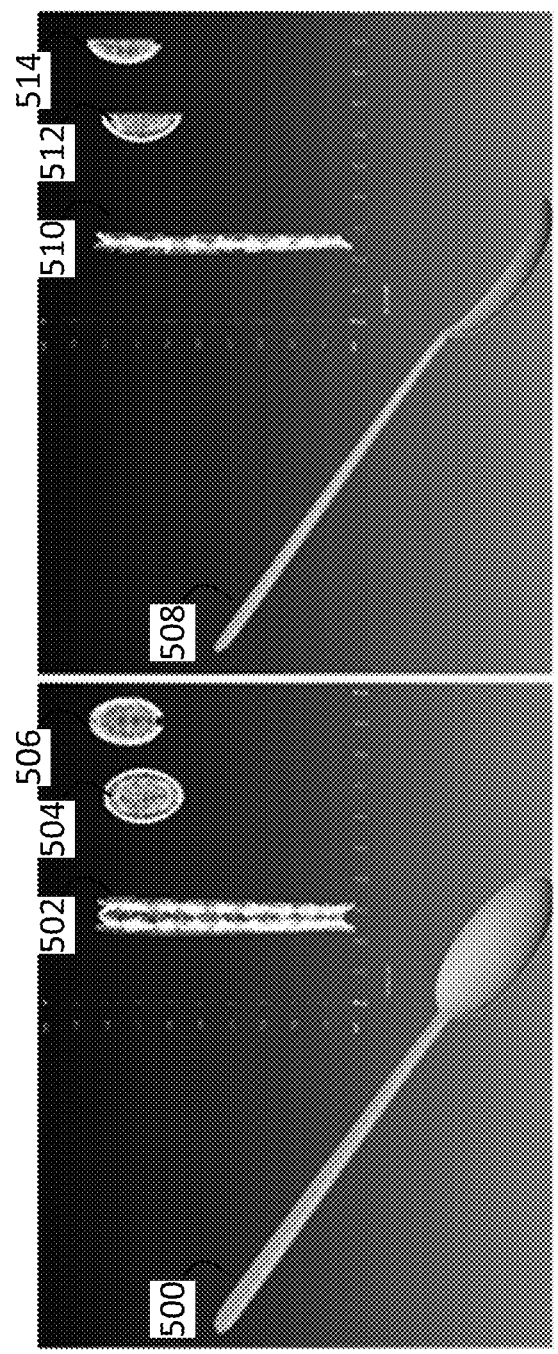
FIG. 5(A) is an illustration of a mesh and a corresponding UV attribute map, in accordance with embodiments of the present disclosure.
FIG. 5(B) is an illustration of a half symmetry mesh and a corresponding UV attribute map, in accordance with embodiments of the present disclosure.

According to one or more embodiments, segmentation is performed on an input symmetry mesh. The input symmetry mesh may be segmented into multiple non-connected parts in the UV attribute map. For example, FIG. 5(A) shows a UV map of a spoon mesh 500 that is segmented into three non-connected parts (502, 504, 506) based on an example segmentation algorithm illustrated in FIG. 6. FIG. 5(B) shows a UV map of the half spoon mesh 508 that is segmented into three non-connected parts (510, 512, 514). The UV map of the half spoon mesh 508 may result in empty spaces between non-connected parts. Accordingly, the vertices in the UV map of the half spoon mesh may be reorganized to reduce the empty spaces between non-connected parts resulting in a more compact mesh. That is, the reorganized vertices occupy a second area that is less than the first area after the reorganizing.

In FIG. 6, the FindSeg(seed,F) is a function to find all UV that directly and indirectly connect to the seed UV. The function FacesContain($U_k$) is a function to find all faces that contain UV in set $U_k$. In one or more examples, the segmentation may be based on texture. For example, non-connected parts may be based on parts of a mesh that have unique texture. For example, referring to FIG. 5(A), the parts 502, 504, and 506 may each have a unique texture with respect to each other. In one or more examples, the segmentation may be based on symmetry property of the input mesh. For example portions of a mesh that are symmetrical to each other may be segmented from other portions of the mesh.

According to one or more embodiments, a 2D symmetry detection method is performed for each segmented UV $\mathcal{U}_i$ to find the symmetry transform $p_i$ for this segment UV. In one or more examples, symmetry prediction is based only on UV coordinates. The prediction technique for 2D images may be applied to UV segments. This symmetry prediction on UV may be independent to the corresponding vertex symmetry. In one or more examples, this approach is only applied to segments with mirror symmetry.

According to one or more embodiments, since As UV coordinates may not maintain the mirror symmetry property, the mirror symmetry may be generalized as a combination of mirror symmetry, rotation, and translation. In one or more examples, the embodiments may be based on geometry symmetry to find corresponding UV pairs. Each UV coordinates $u_j$ may be mapped to its corresponding vertex $v_j$ and classified to a left or a right part of the symmetry as $\mathcal{U}_L^i$, $\mathcal{U}_R^j$. Therefore, given these two sets of UV coordinates, a transformation may be estimated to transform $\mathcal{U}_L^i = p_i(\mathcal{U}_R^i)$ with p being a set of parameters. In one or more examples, a 2D transform TransEst(•) may be represented as a general 3×3 transform matrix as follows.

$$p_i = \begin{bmatrix} a & b & e \\ c & d & f \\ 0 & 0 & 1 \end{bmatrix} = TransEst(\mathcal{U}_L, \mathcal{U}_R), \quad \text{Eq. (1)}$$

with a total of 6 parameters including affine transform.

In one or more examples, only transition, rotation, and mirror are considered. Therefore, only 4 parameters are used as follows.

$$p_i = \begin{bmatrix} a & b & 0 \\ c & d & 0 \\ 0 & 0 & 1 \end{bmatrix} \quad \text{Eq. (2)}$$

Figure 7:
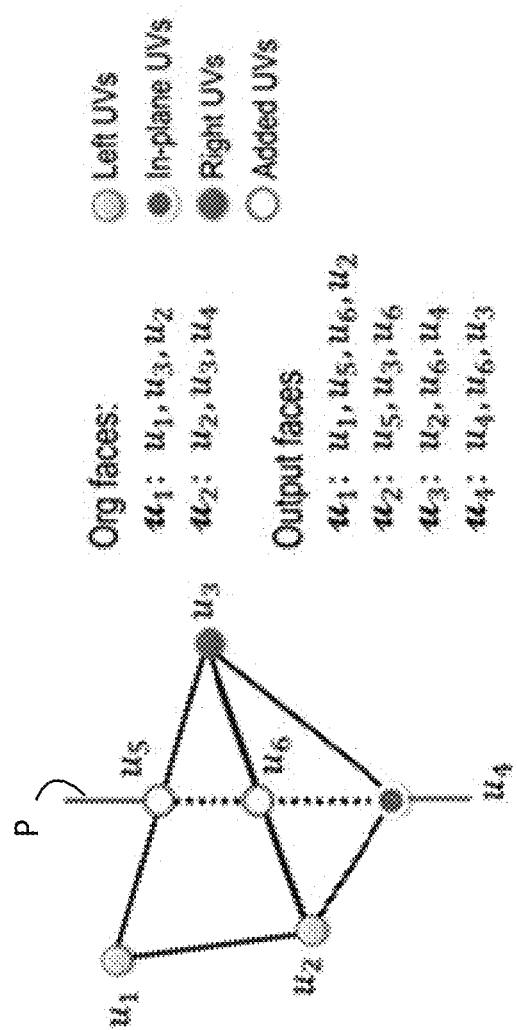
FIG. 7 is an illustration of adding one or more UV vertices to a mesh, in accordance with embodiments of the present disclosure.

According to one or more embodiments, to partition a symmetry mesh, one or more new vertices and edges may be added for cross symmetry plane connectivity. In one or more examples, associated UV and UV connectivity may be added for the added vertices and edges. FIG. 7 illustrates an example segment in which vertices $u_5$ and $u_6$ and associated UV connectivity are added. The set of UV attribute in left, right, and cross symmetry may be $\mathcal{G} = \{\mathcal{G}_R, \mathcal{G}_L, \mathcal{G}_C\}$, respectively.

FIG. 8 illustrates an example algorithm for adding new vertices to a segment. In one or more examples, the operation PlaneLineCollision($v_i$, $v_{i+i}$, $p$) finds the collision point between plane $p$ and two vertices $v_i$, $v_{i+1}$. The operation num($u_{new}$) stands for the number of elements of $u_{new}$. To find the UV associated to new added vertex $v_{new}$, interpolation operator Interpolate(•) may be used, which may perform linear interpolation. Referring to FIG. 7, the plane $p$ intersects the edge between vertices $u_2$ and $u_3$, where vertex $u_5$ is added. Furthermore, the plane $p$ intersects the edge between vertices $u_2$ and $u_3$, where vertex $u_6$ is added. An edge between new vertices u5 and u6 may be added based on interpolation.

The newly added UV may be derived as:

$$u_{new} = \omega * u_1 + (1-\omega) * u_2 \quad \text{Eq. (3)}$$

According to one or more embodiments, given the corresponding vertices $v_i$, $v_{i+1}$ and $v_{new}$ is the newly added vertices by collapse of cross symmetry plane edges and the symmetry plane. The weight for new UV prediction may be derived as:

$$\omega = \frac{|v_{new} - v_i|_2^2}{|v_{i+1} - v_i|_2^2} \quad \text{Eq. (4)}$$

According to one or more embodiments, to extract the to-be-coded half UV, the UV associated with left and in-plane vertices are kept while UV associated with right vertices are discarded. In one or more examples, UV connectivity is remapped to the new UV indices. In one or more examples, displacement coding with predictive UV is performed.

According to one or more embodiments, a transform parameter is estimated based on the corresponding UV pairs that are associated to symmetry vertex pairs of a corresponding UV segment. For instance, the i-th UV segment $\mathcal{U}^1$ may be associated with vertices set $\mathcal{V}^i$. The i-th UV segment $\mathcal{U}^i$ has a left and right UV $\mathcal{U}_L^i$, $\mathcal{U}_R^i$, respectively associated with the left and right portion of vertices $\mathcal{V}_L^i$, $\mathcal{V}_R^i$, respectively. FIG. 9 illustrates an example algorithm used to find the matching pair between left and right UVs in set $\mathcal{U}_L^i$, $\mathcal{U}_R^i$.

In FIG. 9, the operations FindVertex(.) and FindUVs(.) may be functions to find the corresponding vertex of given UV and vice versa. The operation SymmPred(.) may be a function to perform symmetry prediction in 3D with given vertex and symmetry plane Q.

According to one or more embodiments, regression is performed to estimate transform parameter $p_i$ from two sets of 2D points $\mathcal{U}_L^i$, $\mathcal{U}_R^i$. For example, regression analysis may be performed to determine a vertex on a right side of a mesh that is correlated with a vertex on the left side of the mesh to estimate the transform parameter $p_i$. After the transform parameter $p_i$ is estimated, symmetry UV attributes are predicted via the estimated transform parameter $p_i$ as follows.

$$\begin{bmatrix} \hat{u}_r \\ 1 \end{bmatrix} = p_i \begin{bmatrix} u_l \\ 1 \end{bmatrix}, \quad \text{Eq. (5)}$$

with $\hat{u}_r$ denoting the predicted right UV attributes.

Figure 10:
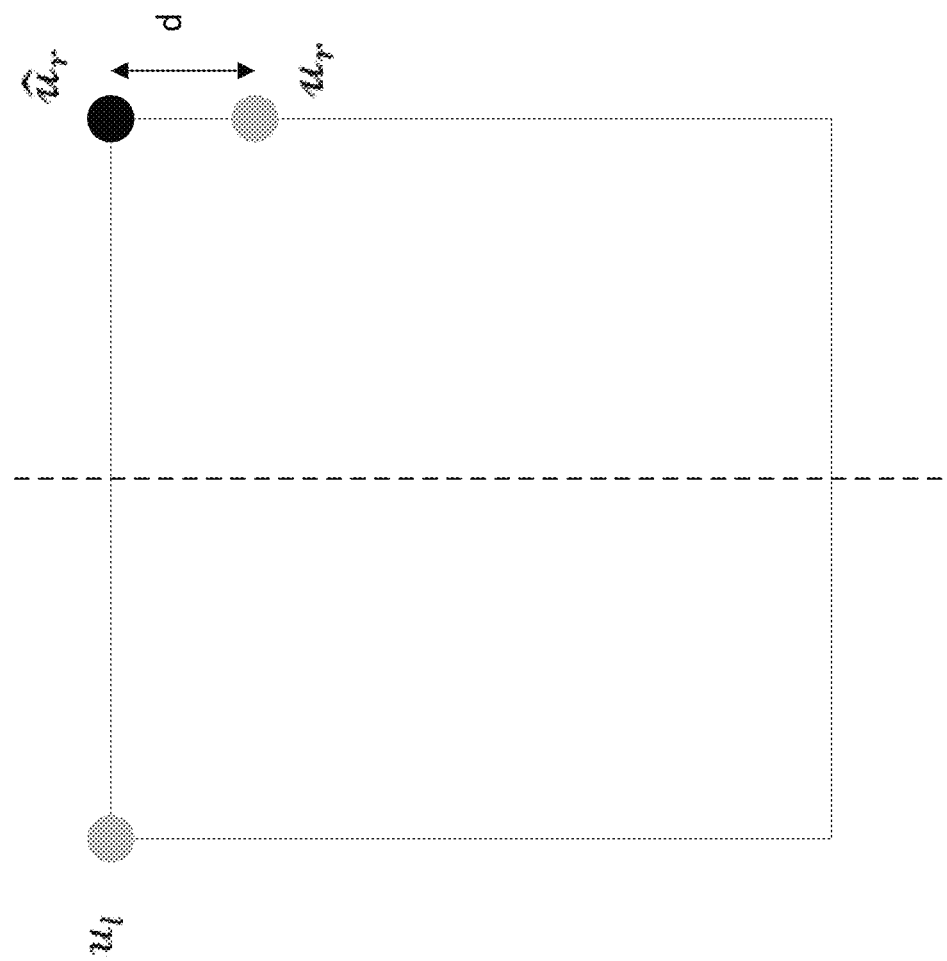
FIG. 10 is an illustration of an example determination of a displacement between an original vertex and a predicted vertex, in accordance with embodiments of the present disclosure.

According to one or more embodiments, a 2D displacement vector coding is used to encode the difference between a predicted $\hat{u}_r$ and original $u_r$. FIG. 10 illustrates an example of predicting a vertex and determining a displacement. As illustrated in FIG. 10, a segment may contain original vertices $u_l$ and $u_r$, which do not display mirror symmetry. The estimated transform may be applied in accordance with Eq. (5) to obtain $\hat{u}_r$. After performing the prediction, the displacement d may be obtained based on the difference between the predicted $\hat{u}_r$ and the original $u_r$.

According to one or more embodiments, the first half UVs are encoded together with the first half of the geometry to utilize their correlation. A perfect and near perfect symmetry mesh may be split to left mesh with vertices, faces, and UV attributes which may be compressed using other codecs. In one or more examples, Draco may be used. As understood by one of ordinary skilling he art According to one or more embodiments, transformation matrices are encoded and signaled in an encoded bitstream. In one or more examples, UV segments and associated transform matrices are sorted in the decreasing order in the number of UV in the remaining left mesh. In one or more examples, based on this order, each parameter in a transform matrix is encoded sequentially row by row.

Figure 11:
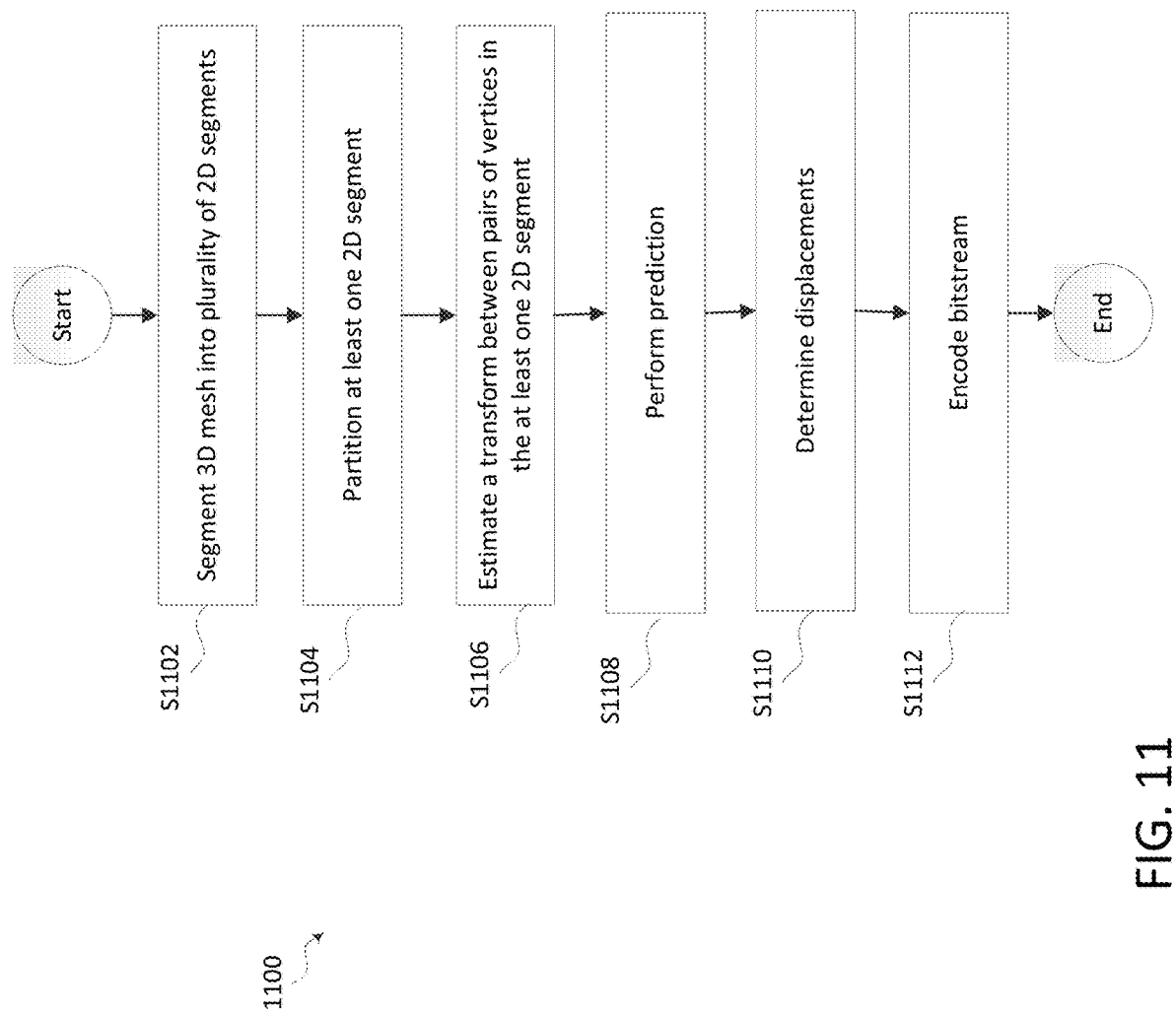
FIG. 11 is an illustration of a flowchart of an example process of encoding a mesh, in accordance with embodiments of the present disclosure.

FIG. 11 illustrates a flowchart of an example process 1100 of encoding a mesh, in accordance with embodiments of the present disclosure. The process starts at operation S1102 in which a 3D mesh is segmented into a plurality of 2D segments. For example, the 3D mesh may be segmented in accordance with the algorithm illustrated in FIG. 6.

The process proceeds to operation S1104 where at least one 2D segment is partitioned. For example, at least one 2D segment is partitioned in accordance with the algorithm illustrated in FIG. 8. The process proceeds to operation S1106 where a transform is estimated between pairs of vertices in the at least one 2D segment. For example, the transform may be estimated based on the algorithm illustrated in FIG. 9.

The process proceeds to operation S1108 where prediction is performed based on the estimated transform. For example, the predication may be performed in accordance with Eq. (5). The process proceeds to operation S1110 to determine displacements between predicted vertices and original vertices. For example, the displacement may be determined in accordance with FIG. 10. The process proceeds to operation S1112 where the bitstream is encoded. The encoded bitstream may include the vertices on one side of a segment (e.g., left side), the predicted transform, and the determined displacements.

Figure 12:
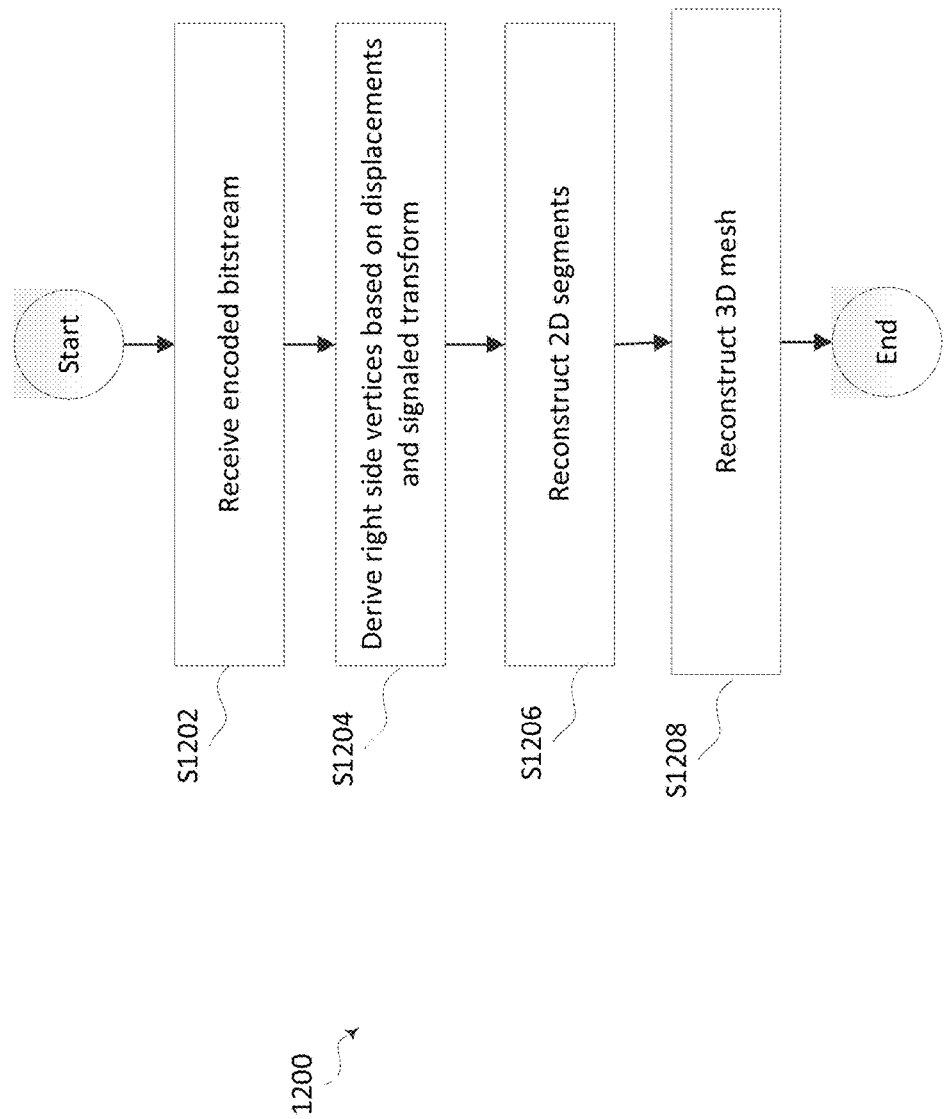
FIG. 12 is an illustration of a flowchart of an example process of decoding a mesh, in accordance with embodiments of the present disclosure.

FIG. 12 is an illustration of a flowchart of an example process 1200 of decoding a mesh, in accordance with embodiments of the present disclosure. The process may start at operation S1202 where an encoded bitstream is received. The left side vertices, transform, and displacements may be decoded from the bitstream.

The process proceeds to operation S1204 where right side vertices are derived. For example, a right side vertex may be derived based using the predicted transform and the left side vertex to determine the predicted right side vertex. The displacement may be added to the predicted right side vertex to derive the original right side vertex.

The process proceeds to operation S1206 where 2D segments are reconstructed based on the decoded left side vertices and derived right side vertices. The process proceeds to operation S1208 where the 3D mesh is reconstructed based on the reconstructed 2D segments.

The techniques, described above, may be implemented as computer software using computer-readable instructions and physically stored in one or more computer-readable media. For example, FIG. 13 shows a computer system 1300 suitable for implementing certain embodiments of the disclosure.

The computer software may be coded using any suitable machine code or computer language, that may be subject to assembly, compilation, linking, or like mechanisms to create code including instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 13:
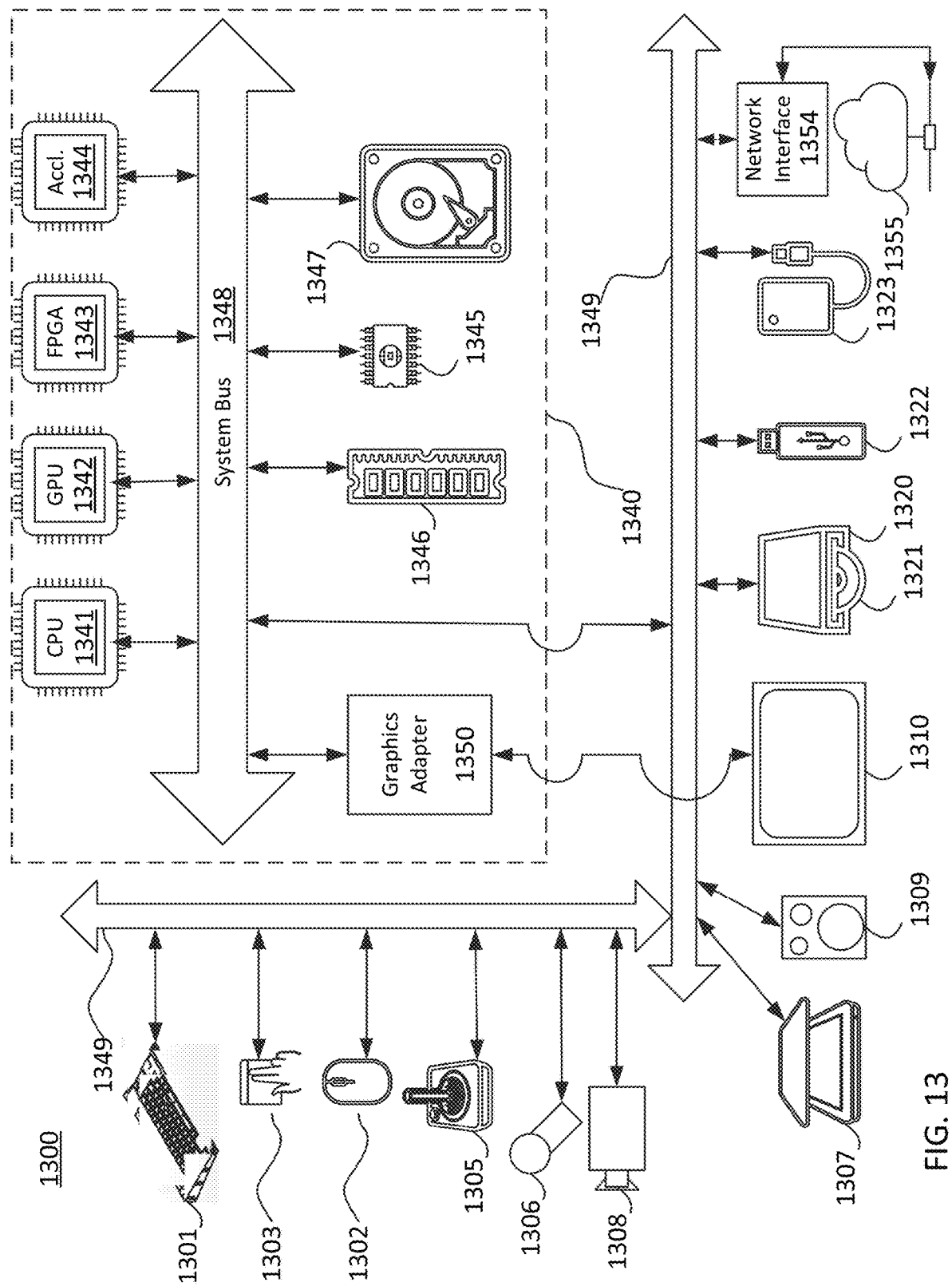
FIG. 13 is a diagram of a computer system suitable for implementing the embodiments of the present disclosure.

The components shown in FIG. 13 for computer system 1300 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 1300.

Computer system 1300 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1301, mouse 1302, trackpad 1303, touch screen 1310, data-glove, joystick 1305, microphone 1306, scanner 1307, camera 1308.

Computer system 1300 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1310, data glove, or joystick 1305, but there may also be tactile feedback devices that do not serve as input devices). For example, such devices may be audio output devices (such as: speakers 1309, headphones (not depicted)), visual output devices (such as screens 1310 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1300 may also include human accessible storage devices and their associated media such as optical media including CD/DVD ROM/RW 1320 with CD/DVD or the like media 1321, thumb-drive 1322, removable hard drive or solid state drive 1323, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1300 may also include interface to one or more communication networks. Networks may be wireless, wireline, optical. Networks may further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 1349 (such as, for example USB ports of the computer system 1300; others are commonly integrated into the core of the computer system 1300 by attachment to a system bus as described below (for example Ethernet interface into a PC computer system or cellular network interface into a smartphone computer system). Using any of these networks, computer system 1300 may communicate with other entities. Such communication may be uni-directional, receive only (for example, broadcast TV), uni-directional send-only (for example CANbus to certain CANbus devices), or bi-directional, for example to other computer systems using local or wide area digital networks. Such communication may include communication to a cloud computing environment 1355. Certain protocols and protocol stacks may be used on each of those networks and network interfaces as described above.

Aforementioned human interface devices, human-accessible storage devices, and network interfaces 1354 may be attached to a core 1340 of the computer system 1300.

The core 1340 may include one or more Central Processing Units (CPU) 1341, Graphics Processing Units (GPU) 1342, specialized programmable processing units in the form of Field Programmable Gate Areas (FPGA) 1343, hardware accelerators for certain tasks 1344, and so forth. These devices, along with Read-only memory (ROM) 1345, Random-access memory 1346, internal mass storage such as internal non-user accessible hard drives, SSDs, and the like 1347, may be connected through a system bus 1348. In some computer systems, the system bus 1348 may be accessible in the form of one or more physical plugs to enable extensions by additional CPUs, GPU, and the like. The peripheral devices may be attached either directly to the core's system bus 1348, or through a peripheral bus 1349. Architectures for a peripheral bus include PCI, USB, and the like. A graphics adapter 1350 may be included in the core 1340.

CPUs 1341, GPUs 1342, FPGAs 1343, and accelerators 1344 may execute certain instructions that, in combination, may make up the aforementioned computer code. That computer code may be stored in ROM 1345 or RAM 1346. Transitional data may be also be stored in RAM 1346, whereas permanent data may be stored for example, in the internal mass storage 1347. Fast storage and retrieve to any of the memory devices may be enabled through the use of cache memory, that may be closely associated with one or more CPU 1341, GPU 1342, mass storage 1347, ROM 1345, RAM 1346, and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, the computer system having architecture 1300, and specifically the core 1340 may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 1340 that are of non-transitory nature, such as core-internal mass storage 1347 or ROM 1345. The software implementing various embodiments of the present disclosure may be stored in such devices and executed by core 1340. A computer-readable medium may include one or more memory devices or chips, according to particular needs. The software may cause the core 1340 and specifically the processors therein (including CPU, GPU, FPGA, and the like) to execute particular processes or particular parts of particular processes described herein, including defining data structures stored in RAM 1346 and modifying such data structures according to the processes defined by the software. In addition or as an alternative, the computer system may provide functionality as a result of logic hardwired or otherwise embodied in a circuit (for example: accelerator 1344), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the embodiments listed below:

A segmentation method is used to segment input symmetry mesh into multiple non-connected parts in the UV attribute map.

(1) A method of encoding an input symmetry mesh, the method comprising: segmenting the input symmetry mesh into multiple non-connected UV segments in a UV attribute map; partitioning at least one UV segment via a plane that partitions the at least one UV segment into a first side and a second side opposite to the first side, the first side including a plurality of vertices occupying a first area; reorganizing the plurality of vertices included in the first side of the at least one UV segment, in which the plurality of vertices occupy a second area less than the first area after the reorganizing; perform a 2D symmetry detection on the at least one UV segment to find a symmetry transform for the at least one UV segment; determining a predicted vertex for each vertex on the second side of the at least one UV segment based on the symmetry transform of a corresponding vertex on the first side of the at least one UV segment to find a predicted vertex on the first side of the at least one UV segment; and encoding a bitstream that comprises at least the vertices within the first side of the at least one UV segment.

(2) The method according to feature (1), in which the input symmetry mesh is segmented based on a texture associated with the input symmetry mesh, and in which at least two non-connected UV segments have a different texture from each other.

(3) The method according to feature (1), in which the input symmetry mesh is segmented based on a symmetry property of the input mesh.

(4) The method of any of features (1)-(3), in which the partitioning the at least one UV segment comprises adding one or more new vertices based on a corresponding collision point between the plane and the at least one UV segment.

(5) The method of feature (4), in which the partitioning the at least one UV segment further comprises adding a new edge between two new vertices.

(6) The method of any one of features (1)-(5), in which the symmetry transform is a six parameter affine transform.

(7) The method of any one of features (1)-(5), in which the symmetry transform is a four parameter affine transform.

(8) The method of any one of features (1)-(7), in which the symmetry transform is determined based on a regression analysis performed between vertices on the first side of the at least one UV segment with vertices on the second side of the UV segment.

(9) The method of any one of features (1)-(8), in which the predicted vertex symmetric to the corresponding vertex on the first side of the at least one UV segment.

(10) The method of feature (5), further comprising: determining a displacement between each vertex on the second side of the at least one UV segment and a corresponding predicted vertex, in which the bitstream further comprises each displacement and the estimated transform.

(11) An encoder for encoding an input symmetry mesh, the encoder comprising: at least one memory configured to store program code; and at least one processor configured to read the program code and operate as instructed by the program code, the program code including: segmenting code configured to cause the at least one processor to segment the input symmetry mesh into multiple non-connected UV segments in a UV attribute map; partitioning code configured to cause the at least one processor to partition at least one UV segment via a plane that partitions the at least one UV segment into a first side and a second side opposite to the first side, the first side including a plurality of vertices occupying a first area; reorganizing code configured to cause the at least one processor to reorganize the plurality of vertices included in the first side of the at least one UV segment, in which the plurality of vertices occupy a second area less than the first area after the reorganization; symmetry transform code configured to cause the at least one processor to perform a 2D symmetry detection on the at least on UV segment to find a symmetry transform for the at least one UV segment; determining code configured to cause the at least one processor to determine a predicted vertex for each vertex on the second side of the at least one UV segment based on the symmetry transform and a corresponding vertex on the first side of the at least one UV segment to find a predicted vertex corresponding to the vertex on the first side of the at least one UV segment; and encoding code configured to cause the at least one processor to encode a bitstream that comprises at least the vertices within the first side of the at least one UV segment.

(12) The encoder according to feature (11), in which the input symmetry mesh is segmented based on a texture associated with the input symmetry mesh, and in which at least two non-connected UV segments have a different texture from each other.

(13) The encoder according to feature (11), in which the input symmetry mesh is segmented based on a symmetry property of the input mesh.

(14) The encoder according to any one of features (11)-(13), in which the partitioning the at least one UV segment comprises adding one or more new vertices based on a corresponding collision point between the plane and the at least one UV segment.

(15) The encoder according to feature (14), in which the partitioning the at least one UV segment further comprises adding a new edge between two new vertices.

(16) The encoder of any one of features (11)-(15), in which the symmetry transform is a six parameter affine transform.

(17) The encoder of any one of features (11)-(15), in which the symmetry transform is a four parameter affine transform.

(18). The encoder of any one of features (11)-(17), in which the symmetry transform is determined based on a regression analysis performed between vertices on the first side of the at least one UV segment with vertices on the second side of the UV segment.

(19). The encoder of any one of features (11)-(18), in which the predicted vertex symmetric to the corresponding vertex on the first side of the at least one UV segment.

(20) A non-transitory computer readable medium having instructions stored therein, which when executed by a processor of an encoder for encoding an input symmetry mesh cause the processor to execute a method comprising: segmenting the input symmetry mesh into multiple non-connected UV segments in a UV attribute map; partitioning at least one UV segment via a plane that partitions the at least one UV segment into a first side and a second side opposite to the first side, the first side including a plurality of vertices occupying a first area; reorganizing the plurality of vertices included in the first side of the at least one UV segment, in which the plurality of vertices occupy a second area less than the first area after the reorganizing; perform a 2D symmetry detection on the at least one UV segment to find a symmetry transform for the at least one UV segment; determining a predicted vertex for each vertex on the second side of the at least one UV segment based on the symmetry transform of a corresponding vertex on the first side of the at least one UV segment to find a predicted vertex on the first side of the at least one UV segment; and encoding a bitstream that comprises at least the vertices within the first side of the at least one UV segment.

What is claimed is:

1. A method of encoding an input symmetry mesh, the method comprising:
    segmenting the input symmetry mesh into multiple non-connected UV segments in a UV attribute map;
    partitioning at least one UV segment via a plane that partitions the at least one UV segment into a first side and a second side opposite to the first side, the first side including a plurality of vertices occupying a first area;

reorganizing the plurality of vertices included in the first side of the at least one UV segment, wherein the plurality of vertices occupy a second area less than the first area after the reorganizing;

perform a 2D symmetry detection on the at least one UV segment to find a symmetry transform for the at least one UV segment;

determining a predicted vertex for each vertex on the second side of the at least one UV segment based on the symmetry transform of a corresponding vertex on the first side of the at least one UV segment to find a predicted vertex on the first side of the at least one UV segment; and encoding a bitstream that comprises at least the vertices within the first side of the at least one UV segment.

2. The method according to claim 1, wherein the input symmetry mesh is segmented based on a texture associated with the input symmetry mesh, and wherein at least two non-connected UV segments have a different texture from each other.

3. The method according to claim 1, wherein the input symmetry mesh is segmented based on a symmetry property of the input mesh.

4. The method of claim 1, wherein the partitioning the at least one UV segment comprises adding one or more new vertices based on a corresponding collision point between the plane and the at least one UV segment.

5. The method of claim 4, wherein the partitioning the at least one UV segment further comprises adding a new edge between two new vertices.

6. The method of claim 1, wherein the symmetry transform is a six parameter affine transform.

7. The method of claim 1, wherein the symmetry transform is a four parameter affine transform.

8. The method of claim 1, wherein the symmetry transform is determined based on a regression analysis performed between vertices on the first side of the at least one UV segment with vertices on the second side of the UV segment.

9. The method of claim 1, wherein the predicted vertex symmetric to the corresponding vertex on the first side of the at least one UV segment.

10. The method of claim 5, further comprising:
determining a displacement between each vertex on the second side of the at least one UV segment and a corresponding predicted vertex,
wherein the bitstream further comprises each displacement and the estimated transform.

11. An encoder for encoding an input symmetry mesh, the encoder comprising:
at least one memory configured to store program code; and
at least one processor configured to read the program code and operate as instructed by the program code, the program code including:
segmenting code configured to cause the at least one processor to segment the input symmetry mesh into multiple non-connected UV segments in a UV attribute map;
partitioning code configured to cause the at least one processor to partition at least one UV segment via a plane that partitions the at least one UV segment into a first side and a second side opposite to the first side, the first side including a plurality of vertices occupying a first area;

reorganizing code configured to cause the at least one processor to reorganize the plurality of vertices included in the first side of the at least one UV segment, wherein the plurality of vertices occupy a second area less than the first area after the reorganization;

symmetry transform code configured to cause the at least one processor to perform a 2D symmetry detection on the at least on UV segment to find a symmetry transform for the at least one UV segment;

determining code configured to cause the at least one processor to determine a predicted vertex for each vertex on the second side of the at least one UV segment based on the symmetry transform and a corresponding vertex on the first side of the at least one UV segment to find a predicted vertex corresponding to the vertex on the first side of the at least one UV segment; and encoding code configured to cause the at least one processor to encode a bitstream that comprises at least the vertices within the first side of the at least one UV segment.

12. The encoder according to claim 11, wherein the input symmetry mesh is segmented based on a texture associated with the input symmetry mesh, and wherein at least two non-connected UV segments have a different texture from each other.

13. The encoder according to claim 12, wherein the input symmetry mesh is segmented based on a symmetry property of the input mesh.

14. The encoder according to claim 11, wherein the partitioning the at least one UV segment comprises adding one or more new vertices based on a corresponding collision point between the plane and the at least one UV segment.

15. The encoder according to claim 14, wherein the partitioning the at least one UV segment further comprises adding a new edge between two new vertices.

16. The encoder of claim 11, wherein the symmetry transform is a six parameter affine transform.

17. The encoder of claim 11, wherein the symmetry transform is a four parameter affine transform.

18. The encoder of claim 11, wherein the symmetry transform is determined based on a regression analysis performed between vertices on the first side of the at least one UV segment with vertices on the second side of the UV segment.

19. The encoder of claim 11, wherein the predicted vertex symmetric to the corresponding vertex on the first side of the at least one UV segment.

20. A non-transitory computer readable medium having instructions stored therein, which when executed by a processor of an encoder for encoding an input symmetry mesh cause the processor to execute a method comprising:
segmenting the input symmetry mesh into multiple non-connected UV segments in a UV attribute map;
partitioning at least one UV segment via a plane that partitions the at least one UV segment into a first side and a second side opposite to the first side, the first side including a plurality of vertices occupying a first area;
reorganizing the plurality of vertices included in the first side of the at least one UV segment, wherein the plurality of vertices occupy a second area less than the first area after the reorganizing;
perform a 2D symmetry detection on the at least one UV segment to find a symmetry transform for the at least one UV segment;

determining a predicted vertex for each vertex on the second side of the at least one UV segment based on the symmetry transform of a corresponding vertex on the first side of the at least one UV segment to find a predicted vertex on the first side of the at least one UV segment; and encoding a bitstream that comprises at least the vertices within the first side of the at least one UV segment.

\* \* \* \* \*